United States Patent [19]

Landis et al.

[11] Patent Number: 4,613,637

[45] Date of Patent: Sep. 23, 1986

[54] COPOLYMERS UTILIZING ISOIMIDES AND METHOD OF PREPARING SAME

[75] Inventors: Abraham L. Landis, Northridge; Arthur B. Naselow, Marina del Rey, both of Calif.

[73] Assignee: Hughes Aircraft Company, Los Angeles, Calif.

[21] Appl. No.: 566,089

[22] Filed: Dec. 27, 1983

[51] Int. Cl.$^4$ .................. C08G 73/10; C08G 73/12
[52] U.S. Cl. ................... 524/105; 524/108; 524/113; 524/233; 524/361; 524/365; 526/266; 528/26; 528/28; 528/125; 528/126; 528/128; 528/172; 528/179; 528/182; 528/185; 528/188; 528/208; 528/351; 528/352; 528/353; 549/297; 549/298; 549/299; 549/300; 549/303; 549/320
[58] Field of Search ............. 528/26, 28, 125, 126, 528/128, 172, 179, 182, 185, 188, 208, 351, 352, 353; 526/266; 549/297, 298, 299, 300, 303, 320; 524/600, 105, 113, 108, 233, 361, 365

[56] References Cited

U.S. PATENT DOCUMENTS

| | | | |
|---|---|---|---|
| 3,261,811 | 7/1966 | Tatum | 524/600 |
| 3,271,366 | 9/1966 | Kreuz | 528/353 |
| 3,282,898 | 11/1966 | Angelo | 528/353 |
| 3,316,212 | 4/1967 | Angelo | 528/353 |
| 3,413,267 | 11/1968 | Kreuz | 528/353 |
| 4,485,231 | 11/1984 | Landis | 528/185 |
| 4,495,342 | 1/1985 | Landis | 528/185 |
| 4,496,711 | 1/1985 | Landis | 528/185 |

*Primary Examiner*—Lester L. Lee
*Attorney, Agent, or Firm*—M. E. Lachman; A. W. Karambelas

[57] ABSTRACT

A copolymer formed from an isoimide oligomer and another compound, such as an aryl sulfone, each of which has reactive functional terminal groups, such as ethylenic or acetylenic groups. The isoimide oligomer is soluble in the other compound, unreactive with the compound below a certain temperature and forms a liquid blend therewith. Upon heating the liquid blend above that certain temperature, the terminal groups on the isoimide oligomer and the other compound react with each other to form a copolymer. The liquid blends may be used to form encapsulants, coatings, films, and resin matrices for composites to provide resins with excellent high temperature properties.

39 Claims, No Drawings

COPOLYMERS UTILIZING ISOIMIDES AND METHOD OF PREPARING SAME

BACKGROUND OF THE INVENTION

1. Field of the Invention

This invention relates to solutions or homogeneous mixtures of an isoimide oligomer and another compound, and is particularly directed to castable or encapsulating resin solutions of an isoimide oligomer and another compound such as a sulfone, the isoimide oligomer and other compound both having functional terminal groups, such as acetylene groups, and being reactive at elevated temperatures to form a copolymer, such solutions having a relatively low melting point and sufficient fluidity at temperatures below curing temperatures to enable the mixture or solution to be used for melt-impregnation or for encapsulating or other applications.

2. Description of the Prior Art

Polyimide resins are materials having excellent thermal mechanical properties at high temperatures, and are also useful in the production of various electrical components because of the good electrical properties of such resins. In order to be formed into useful materials or cured resins, the precursor amic acid or esters are dissolved in an appropriate solvent and processed by conventional casting or dipping techniques. The precursor is then converted to the imide at high processing temperatures through a condensation reaction.

To overcome some of the problems associated with the formation of volatile materials from these condensation reactions, addition curable polyimide oligomers containing acetylene terminal groups and based on the homopolymerization of acetylene have been developed. Representative acetylene substituted polyimide oligomers of this type can be characterized by the structural formula:

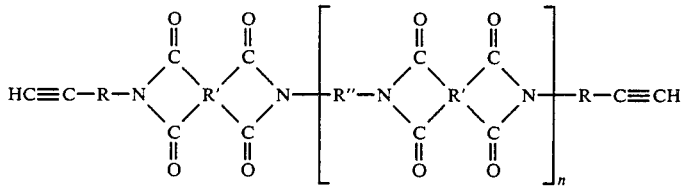

where R is a divalent organic group, preferably a divalent aryl group, R' is a tetravalent aromatic group, R" is a divalent aryl group, and n is 1 to about 20. Preferably, R, R' and R" are aryl having 6–24 carbon atoms and n is 1 to about 15. Polyimides of this type are described in U.S. Pat. Nos. 3,864,309; 3,845,018; 3,879,349; and 3,928,450, all of which are assigned to the present assignee.

However, the above-described acetylene substituted polyimide oligomers are relatively high melting (200°–220° C.) and have a very narrow "processing window", that is, at temperatures at which they would have good fluidity to be able to be used as a castable resin, the gel time is extremely short. Also, they are soluble in a limited number of solvents such as N-methyl pyrrolidone or N,N-dimethyl formamide. Various attempts have been made to use or incorporate various low melting materials with the above-noted acetylene-substituted polyimide oligomers, to reduce the melting point thereof, but have not been successful due, in large measure, to mutual solubility problems.

An isomeric form of the acetylene-terminated polyimide oligomers has been developed, namely the isoimide form, which has a wide processing window, as for example, a wide solubility range in a large number of available solvents. Hence it is desirable to work with the isoimide form of oligomers and thereafter convert the isoimide form of oligomer to the polyimide form. The isoimide form of oligomer is soluble in a greater number of solvents and also has a lower melting point (140°–160° C.) than the corresponding, e.g. acetylene-substituted, polyimide oligomers. However, even the above-noted isoimide form of the acetylene-terminated oligomers may have too high a melting point to provide a good castable resin.

Acetylene-terminated phenylene resins have been developed in an attempt to produce a resin system which embodies the rheological advantages and specifically the easy processability of epoxy resins and having the high temperature properties of the polyimides. An example of such a material is a resin formed from the oligomer, 4,4'-bis(3-ethynylphenoxy)diphenylsulfone (ATS). Although such an oligomer is quite fluid at low temperatures of 40° C., the cured resin is quite brittle and hence undesirable in this respect. In addition, this latter oligomer does not possess the significant high temperature properties of the copolymers of the present invention.

U.S. Pat. No. 4,098,767 to Bilow, assigned to the present assignee, discloses copolymers of ethynyl terminated polyimide oligomers and a di- or poly ethynyl compound, such as diethynylbenzene. U.S. Pat. No. Re. 30,217 to Bilow, assigned to the present assignee, discloses a copolymer of an acetylene terminated polyimide oligomer and a dinitrile dioxide, such as terephthalonitrile N,N'-dioxide. However, here again, the acetylene terminated polyimide oligomers employed in these latter patents are relatively high melting and copolymerization thereof with the specified monomers requires relatively high curing temperatures.

SUMMARY OF THE INVENTION

In a broad aspect, it has been found according to the present invention, that an isoimide oligomer and another compound can be reacted to form a copolymer of such isoimide oligomer and such other compound. This other compound encompasses both monomeric and polymeric compounds, including prepolymers. The isoimide oligomer and such other compound both have functional terminal groups, such as acetylene groups, which are reactive with one another, and wherein the isoimide oligomer was initially soluble in and unreactive with the other compound below a certain temperature, so that isoimide and other compound remain as an unreacted liquid fluid below such temperature, and wherein the isoimide oligomer and other compound react to form the copolymer upon heating above that certain temperature.

Thus, broadly, the isoimide oligomer (Compound A) would have a pair of functional reactive groups (N and M) and the other compound or polymer (Compound B) would have at least one functional reactive group (W), which may be illustrated as follows:

N—isoimide—M            (Compound A)

W—E                     (Compound B)

In a more preferred embodiment of the invention, the other compound (Compound B) would have a pair of functional reactive groups (W and Z), which may be illustrated as follows:

N—isoimide—M            (Compound A)

W—E—Z                   (Compound B)

where N, M, W and Z are each functional groups which are reactive with one another, and E represents the divalent radical of an organic compound or polymer. In some cases, Compound B may have only one functional group to copolymerize, e.g. phenylacetylene. Compound A, the isoimide oligomer, and Compound B are mutually soluble, e.g. in one another or in a common solvent, and are reactive with one another. The mixture of the two compounds is unreactive below a certain temperature. In essence then, the functional terminal groups can be any groups which will react with each other, and are generally unsaturated, such as acetylene, vinyl and nitrile groups. All of the functional terminal groups on Compounds A and B can be the same, or some of the functional terminal groups can be different than other functional groups, but reactive therewith. In one preferred embodiment, Compound A is an acetylene-terminated isoimide oligomer and Compound B is an ethynylated compound containing terminal acetylene groups, such as ethynyl substituted ethers, or sulfones containing terminal acetylene groups.

Compound B, such as the acetylene-terminated sulfone, has a lower melting point than Compound A, such as the acetylene-terminated isoimide oligomer, and when the lower melting Compound B goes into a melt phase, the isoimide is soluble in the liquid Compound B. An important feature of the invention is that the isoimide, which is generally a powder, will normally be soluble in Compound B when the latter is at a temperature at which it is in liquid form. Usually, Compound B is liquid at room temperature and temperatures somewhat higher, e.g. 20° C. to about 150° C. In this temperature range, for example, the Compound B and isoimide may not react although one is soluble in the other.

In many cases, Compound B may not be liquid at room temperature. Thus, Compound B, e.g. the acetylene-terminated sulfone, as well as Compound A, the isoimide oligomer, are solubilized in a solvent and thereafter the solvent is stripped off or removed to thereby form a solid solution in which the isoimide oligomer is solubilized in Compound B.

In any case, when heated to a certain melt temperature, the two compounds will react, thereby forming a copolymer. For example, at 50° C., the acetylene-terminated isoimide oligomer and the acetylene-terminated sulfone will remain as a solution, but at temperatures greater than 150° C., they may react.

It is also possible to heat the sulfone or other compound to a temperature to melt this compound but which is below the reaction temperature and thereby dissolve the isoimide in the liquified sulfone or other compound to form a liquid blend or homogenous phase. In this way, solubilization can be achieved without reaching the reaction temperature of the two compounds and without the necessity of using a solvent system.

According to another feature of the invention, no volatile by-product is formed in the reaction. When the blend of the two compounds is heated sufficiently, upon curing they will form a polyimide copolymer. However, immediately after heating, the blend of the two compounds will remain a pourable liquid, and such liquid can be used as by pouring over any desired item to encapsulate the same. Then, further heating of the liquid to a reaction temperature causes a reaction of the two compounds A and B to form the copolymer. Thus, for example, the pourable liquid can be used to pour over a high voltage motor for purposes of encapsulating the motor. The resulting copolymer generally will be highly cross-linked.

Compound A can be monomeric or polymeric and when reacted with Compound B by heating to the reaction temperature, the two compounds will convert to an imide copolymer. Compound A, when acetylene-terminated, may have a structure, such as:

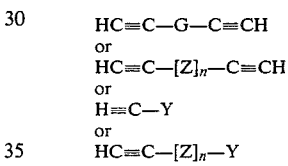

HC≡C—G—C≡CH
or
HC≡C—[Z]$_n$—C≡CH
or
H≡C—Y
or
HC≡C—[Z]$_n$—Y

In the above-identified products, G may be a divalent aromatic, aliphatic, or heterocyclic moiety. Z may be a polymer with n representing the number of repeating units. Y may be any alkyl group, e.g. —CH$_3$, —C$_2$H$_5$, etc., or any alkenylene group or a heterocyclic group or an aryl group.

The exact structure of the imide copolymer will depend to a large extent upon the Compound A and Compound B which are used, the proportions thereof and the reaction conditions. The isoimide oligomer used in accordance with the present invention enables the imide copolymer to be easily produced in various copolymer forms with substantially improved processing conditions.

It is possible to tailor the rigidness and fracture toughness of the copolymer by controlling the degree of crosslinking. The degree of crosslinking is a function of at least the degree of polymerization of the isoimide oligomer.

In order to use the resin mixture for purposes of casting the resin or for purposes of encapsulating various devices in the resin, it is possible to heat the resin at least to the reaction temperature and perhaps to a temperature somewhat higher than the reaction temperature. Depending upon the specific isoimide oligomer and Compound B which may be utilized, there may be a sufficient pot life such that a cure is not immediately initiated. The temperature chosen for casting the resin or for encapsulating a device will depend, to a large extent, on the gel time required to cast a part or encapsulate a device. Thus, the composition would remain in liquid form and would be poured over the item to be encapsulated with sufficient time for the reaction to proceed to a final cure. In many cases, after the solution has been heated to liquefaction, but below the reaction temperature, it may then be cast into a mold or poured upon the item to be encapsulated. Thereafter, in the case of encapsulation, this item could be introduced into an oven or a similar environment to heat the then liquid resin surrounding the item to the reaction temperature where it would be retained until the reaction has proceeded to a full cure.

More specifically, it has been found that the acetylene-terminated isoimide oligomers, as more particularly defined below, are very soluble in acetylene-terminated sulfones. In addition, such sulfones, particularly 4,4'-bis(3-ethynylphenoxy)diphenylsulfone (ATS), have a low melting point as well as being an excellent solvent for such isoimide oligomers, and are nonreactive with such oligomers in the melt phase. When used alone, acetylene-terminated isoimide oligomers have too high a melting point to make a good castable or encapsulating resin blend, whereas acetylene-terminated sulfones, such as 4,4'-bis(3-ethynylphenoxy)-diphenylsulfone (ATS), when used alone, have low melting points, but form a brittle cured resin. However, solutions of acetylene-terminated isoimide oligomers in such sulfones have a low melting temperature and provide resin blends. These blends, upon heating and curing, form a tough non-brittle cured polyimide copolymer having the mechanical properties at high temperatures and good electrical properties characteristic of polyimide resins.

The term "oligomer" as used herein shall refer to those polymeric precursors which contain reactive functional groups and are capable of undergoing self-polymerization, as for example, upon heating. Thus, the term oligomer shall include those compositions which have one or more units as hereinafter discussed, as long as they meet the above-identified criteria.

This invention possesses many other advantages and has other purposes which may be made more clearly apparent from a consideration of the forms in which it may be embodied. These forms will now be described in detail for the purpose of more fully setting forth the general principles of the invention, but it is to be understood that such detailed descriptions are not to be taken in a limiting sense.

DETAILED DESCRIPTION OF THE INVENTION

The isoimide oligomers employed according to this invention will have one of the following formulae depending on the particular mode of reaction to produce such oligomer, as hereinafter described:

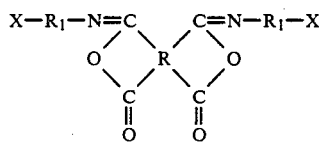

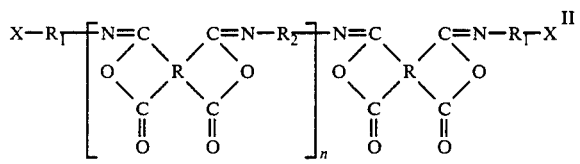

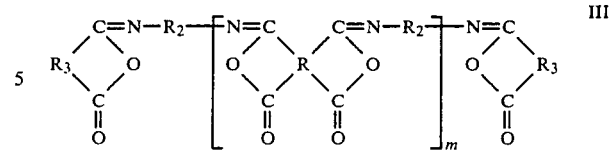

where R, $R_1$, $R_2$, $R_3$ and X are as defined hereinafter, and n and m each denote the degree of polymerization and are described hereinafter.

There are three generic forms of isoimide oligomers which may be used in accordance with the present invention. The three generic forms of oligomers which may be used and which are disclosed herein are only representative of those oligomers which may be used.

The three processes for producing the oligomers included in the generalized formulae mentioned above are broadly set forth below:

The process for preparing an isoimide-containing oligomer defined above by formula I comprises:

(a) reacting a carboxylic acid dianhydride having the formula:

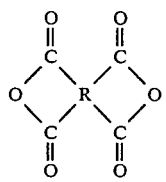

wherein R is a tetravalent organic group containing 2 to 27 carbon atoms, with a functional amine having the formula $H_2N—R_1—X$ wherein $R_1$ is a divalent organic group containing 1 to 20 carbon atoms, and (b) dehydrating the resulting product under conditions to form an isoimide-containing oligomer substantially free of side reaction products. The oligomer thus produced has the formula of oligomer I, i.e.

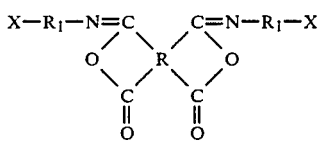

where R and $R_1$ are defined above, and X is a functional group capable of undergoing addition polymerization with another radical having an unsaturated functional group.

It should be understood that when reacting a dianhydride with a mono-amine, the degree of polymerization (DP) is only one. Thus, it is preferred to react the dianhydride with a diamine followed by reaction with a monoamine to produce oligomer II as described below in more detail.

In one of the more preferred embodiments which uses the oligomer defined previously by formula II, the process for preparing this isoimide-containing oligomer comprises:

(a) reacting a carboxylic acid dianhydride having the formula:

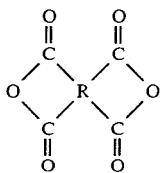

where R is a tetravalent organic group containing 2 to 27 carbon atoms, with a diamine having the formula:

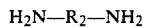

wherein $R_2$ is a divalent organic group containing 2 to 30 carbon atoms;

(b) reacting the product of (a) with a functional amine having the formula:

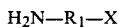

wherein $R_1$ is a divalent organic group containing 1 to 20 carbon atoms; and (c) dehydrating the resulting product under conditions to form an isoimide-containing oligomer essentially free of side reaction products.

The oligomer thus produced has the formula of oligomer II, i.e.

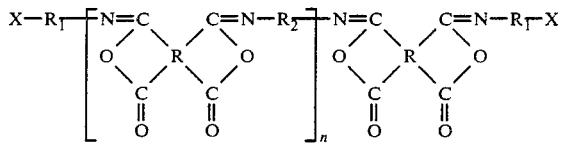

where R, $R_1$ and $R_2$ are defined above, X is a functional group capable of undergoing addition polymerization with another radical having an unsaturated functional group, and n denotes the degree of polymerization and is 0 or 1 to about 30 and preferably 0 or 1 to about 15.

In another embodiment which uses the oligomer identified previously by formula III, the process for preparing that isoimide-containing oligomer comprises:

(a) reacting a carboxylic acid dianhydride having the formula:

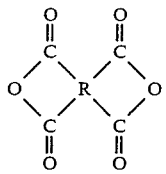

wherein R is a tetravalent organic group containing 2 to about 27 carbon atoms, with a diamine having the formula:

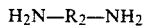

wherein $R_2$ is a divalent organic group containing 2 to 30 carbon atoms;

(b) reacting the product of (a) with a monoanhydride having the formula:

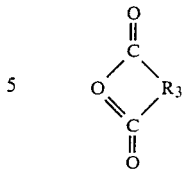

and (c) dehydrating the resulting product under conditions to form an isoimide-containing oligomer substantially free of side reaction products. The oligomers thus produced have the formula of oligomer III, i.e.

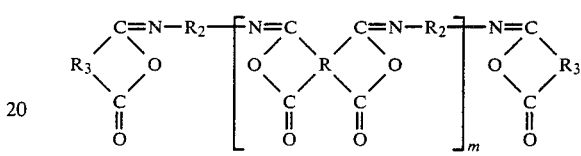

and where R and $R_2$ are defined above, $R_3$ is a radical containing an alkenylene group, or a trivalent aryl group or heterocyclic group having substituted thereon an unsaturated functional group capable of undergoing addition polymerization with another radical having an unsaturated functional group, and m denotes the degree of polymerization and is 1 to about 30 and preferably 1 to about 15.

The dehydration or cyclization is preferably carried out using a cyclization or dehydrating agent. This agent is preferably selected from the group consisting of trifluoroacetic anhydride (TFAA) and N,N-dicyclohexylcarbodiimide (DCC), and dehydration preferably occurs at temperatures ranging from about 20° C. to about 0° C., under conditions to form an isoimide-containing oligomer substantially free of side reaction products. Addition of the trifluoroacetic anhydride or N,N-dicyclohexylcarbodiimide to a reaction mixture under suitable reaction conditions produces cyclization of the polyamic acid to the acetylene-terminated isoimide oligomer. This reaction results in a product which is essentially free of undesirable impurities or side reaction products and also produces a product which has the highest amount of isoimide linkages in the polymeric backbone.

In the isoimide oligomers employed according to the invention which have the structural formulae identified above, R is a tetravalent organic group containing 2 to 27 carbon atoms, preferably a tetravalent aryl group containing 6 to 18 carbon atoms, such as tetravalent phenyl, naphthyl, anthranyl and benzophenone; $R_1$ is a divalent organic group containing 1 to 20 carbon atoms, preferably a $C_1$ to $C_5$ alkylene group or a $C_6$ to a $C_{20}$ arylene group, such as methylene, dimethylene, trimethylene, phenylene or naphthalene; X is a functional group capable of undergoing addition polymerization either with itself or with a comonomer to form an addition polymer; and the two X's in formula I, for example, may be the same or different functional groups. In general, the functional group is one containing carbon-to-carbon unsaturation, usually ethylenic unsaturation or acetylenic unsaturation, such as vinyl and acetylene groups. Also, a cyano group can be employed.

In the embodiment where the dianhydride is reacted with a functional mono-amine to form oligomer I, the degree of polymerization, n, will be 0. Thus, as indicated above, one of the more preferred embodiments uses the reaction of a dianhydride with a diamine, followed by reaction with a mono-amine, and this latter reaction is described in more detail below.

Examples of dianhydrides which can be used include:
pyromellitic anhydride;
3,4,3',4'-benzophenone tetracarboxylic dianhydride, (often designated "BTDA");
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl)propane dianhydride;
bis(3,4-dicarboxyphenyl)sulfone dianhydride;
3,4,9,10-perylene tetracarboxylic dianhydride;
bis(3,4-dicarboxyphenyl)ether dianhydride;
2,6-dichloronaphthalene-1,4,5,8-tetracarboxylic dianhydride;
1,1-bis(2-3-dicarboxyphenyl)ethane dianhydride;
2,2-bis(3,4-dicarboxyphenyl)hexafluoroisopropylidene dianhydride (often designated "6FDA");
2,3-bis[4-(3,4-dicarboxyphenoxy)phenyl]dihydride hexafluoropropane dianhydride (often designated "BFDA");
2,2-bis(phthalic anhydride)hexafluoropropane dianhydride.

Other dianhydrides may also be used, including those containing heterocyclic rings, such as S-heterocycles, O-heterocycles, N-heterocycles and combinations thereof. For example, use can also be made of pyrazine-2,3,5,6-tetracarboxylic dianhydride or thiophene-2,3,4,5-tetracarboxylic dianhydride.

Examples of functional mono-amines which can be employed include:
allyl amine;
propargyl amine;
3-aminophenyl acetylene;
3-(3-aminophenoxy)phenyl acetylene;
3-aminostyrene;
3-amino-4-bromostyrene;
3-aminobenzonitrile;
4-aminophenyl acrylate;
3-aminobenzyl methacrylate; and
4-aminobenzyl methacrylate.

As the mono-amine is reacted with the dianhydride, use should be made of a mono-amine which is substituted with a functional group capable of undergoing addition polymerization reactions. Such functional groups are well known to those skilled in the art. In general, the functional group is one containing carbon-to-carbon unsaturation, usually ethylenic unsaturation or acetylenic unsaturation; it is also possible to employ, as the functional group, a cyano group which can be copolymerized by reaction with, for example, terephthalonitrile-N,N'-dioxides as described in previously referenced U.S. Pat. No. 3,864,309, the disclosure of which is incorporated herein by reference.

It is preferred that the mono-amine have the formula $H_2N-R_1-X$ wherein $R_1$ is a divalent organic group containing 1 to 20 carbon atoms and X is a functional group capable of undergoing addition polymerization. X is preferably selected from the group consisting of $-C\equiv CH$, $-CH=CH_2$, $-CN$ or the following group:

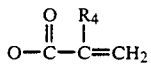

where $R_4$ is H or $-CH_3$.

In general, the reaction is carried out preferably in the presence of a solvent such as an aliphatic ether solvent. The temperature of reaction is not critical and can be maintained below 100° C. After the reaction has been completed, the product is in the form of a polyamic acid which can be converted to the corresponding isoimide through the use of a dehydrating agent such as trifluoroacetic anhydride (TFAA), or N,N'-dicyclohexylcarbodiimide (DCC) at relatively low temperatures, usually below 60° C.

In a preferred embodiment, an aromatic polyamine is reacted with the dianhydride, preferably prior to reaction with the mono-amine. Although it is possible to mix all reactants at one time, it is preferable to first react the polyamine with the dianhydride. The polyamine, preferably a diamine, serves to link together two or more moles of the dianhydride, leaving terminal anhydride groups capable of reaction with the monoamine.

To produce an oligomer of a DP of n=1, the reactants are used in mole proportions so that for two moles of dianhydride, one mole of the diamine and 2 moles of the monoamine are used. The dianhydride is generally used in excess and the total of the moles of mono-amine and diamine depends on the desired degree of polymerization. As the ratio of the diamine and the dianhydride is increased, the degree of polymerization and molecular weight is also increased.

The degree of polymerization is dependent upon the stoichiometry of the reactants, and the proportions of the reactants will produce the identified degree of polymerization as set forth in Table I.

TABLE I

| MONO-AMINE | DIANHYDRIDE | DIAMINE | n |
|---|---|---|---|
| 2 | 1 | 0 | 0 |
| 2 | 2 | 1 | 1 |
| 2 | 3 | 2 | 2 |
| 2 | 4 | 3 | 3 |
| 2 | 5 | 4 | 4 |
| 2 | 6 | 5 | 5 |

In addition to the whole number integers for n shown above, values of n other than whole integers (e.g. 1.2 or 2.7) can be obtained by appropriate variation in the stoichiometry of the reactants.

As indicated above, the more preferred isoimide oligomers are formed from a dianhydride and a diamine, followed by reaction with a mono-amine. The preferred diamines are aromatic diamines containing a divalent aromatic group, preferably containing 6 to 30 carbon atoms, such as arylene or arylene ether groups. Representative diamines are:
meta-phenylenediamine;
2,2-bis(4-aminophenyl)propane;
4,4'-diaminodiphenyl methane;
4,4'-diaminodiphenyl sulfide;
4,4'-diaminodiphenyl sulfone;
3,3'-diaminodiphenyl sulfone;
2,6-diaminopyridine;
bis-(4-aminophenyl)diethylsilane;
bis-(3-aminophenyl)ethyl phosphine oxide;
1,3-di(3-aminophenyl)hexafluoropropane;

2,2-di(3-aminophenyl)hexafluoropropane;
2,2-di(4-aminophenyl)hexafluoropropane; and
2,2-bis[4-(4-aminophenoxy)phenyl]hexafluoropropane.

The diamine is preferably a compound having the formula:

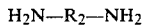

wherein $R_2$ is a divalent organic group containing from 2 to 30 carbon atoms and preferably an aromatic group, containing 6 to 30 carbon atoms. Preferred are arylene, arylene ether, and arylene thioether groups. Representative of such groups include a phenylene group or a naphthylene group as well as a group having the formula:

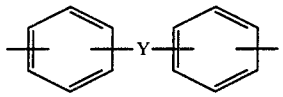

wherein Y is

$-(CH_2)_x-$, $-C(CH_3)_2-$ where x is an integer from 1 to 5, $-O-$, $-S-$, $-SO_2-$, $-C(CF_3)_2-$, $(CF_2)_x-$ where x is as defined above, and the following groups:

wherein $R_6$ and $R_7$ are aryl (such as phenyl and naphthyl, and substituted derivatives thereof) or alkyl containing 1 to 5 carbon atoms.

The preferred isoimide oligomers employed according to the invention are those isoimide oligomers having formula II, namely,

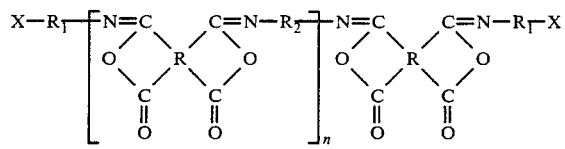

where R is a tetravalent organic group containing 2 to 27 carbon atoms, and more preferably aryl containing 6 to 18 carbon atoms; $R_1$ is a $C_6$ to a $C_{20}$ arylene group as defined above, and $R_2$ is a divalent organic group, preferably a divalent aromatic group containing 2 to 30 carbon atoms, such as phenylene, naphthalene, anthracenyl, and substituted derivatives thereof, e.g. substituted with a lower alkyl group of from 1 to 5 carbon atoms, such as methyl, ethyl, etc., halogens such as chlorine, bromine, etc. $R_2$ may include heterocyclic groups of from 5 to 30 carbon atoms. In the above formula, n denotes the degrees of polymerization and is 0 or 1 to about 30, as aforesaid, and X is a functional group as defined above, particularly the acetylene group $-C\equiv CH$.

Such preferred acetylene-terminated oligomers can be prepared by reaction of an aromatic dianhydride, an aromatic diamine and an amino acetylene, particularly an aromatic amino acetylene, as described above, under suitable reaction conditions to produce the amic or polyamic acid. The use of trifluoroacetic anhydride and N'N-decyclohexylcarbodiimide in solvents such as tetrahydrofuran or dioxane is preferred to provide dehydration and cyclization of the amic acid, and results in isoimide oligomers essentially free of undesirable impurities.

The predominant degree of polymerization can be affected by controlling the proportions of the reactant. For example, the preparation of an oligomer of the type shown above having a degree of polymerization (DP) of 0 or 1 to about 30 (n=0 or 1 to about 30) is desirable. However, it should be understood that degrees of polymerization slightly greater than 30, e.g. 31, 32, etc., could be encompassed by the present invention. However, in a more preferred aspect of the invention, the degree of polymerization is 0 or 1 to about 15.

The isoimide oligomer of structural formula II can be used when the compound to be copolymerized therewith has a pair of functional reactive groups as previously described, or only one functional reactive group.

In accordance with yet another embodiment of the invention, a dianhydride as defined above, is reacted with a diamine as defined previously, to form an amine-terminated polyamic acid, which is then reacted with a mono-anhydride containing a functional group capable of undergoing addition polymerization, as described above. The resulting product is then subjected to a dehydration reaction to convert the amic acid groups to isoimide groups. Examples of such mono-anhydrides are 4-ethynylphthalic anhydride, 4-vinylphthalic anhydride, 4-cyanophthalic anhydride, maleic anhydride and norbornene anhydride.

Such oligomer can have the previously cited formula III, namely:

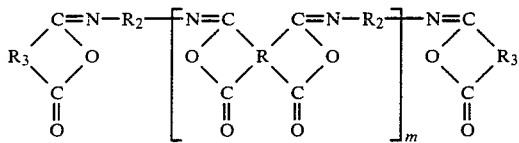

where $R_2$ is a divalent organic group, preferably aryl, containing 2 to 30 carbon atoms, as defined above, $R_3$ is a radical containing an alkenylene group, or a trivalent aryl group or heterocyclic group having substituted thereon an unsaturated functional group capable of undergoing addition polymerization, and m denotes the degree of polymerization, which preferably ranges from 1 to about 15, but which can range from 1 to about 30. Here again, the degree of polymerization can be slightly higher, if required, e.g. 31, 32, etc.

Such isoimide oligomers as previously described and the processes for producing such isoimide oligomers are described in copending allowed U.S. Patent Application Ser. No. 206,317, filed July 24, 1981, for "Isoimide Containing Oligomers" by A. L. Landis, which is incorporated herein by reference, and in continuation-in-part patent applications therefrom, Ser. Nos. 535,460 and 535,975 and 536,068, filed Sept. 26, 1983 for "Isoimide Containing Oligomers and Process for Producing Same" by A. L. Landis, assigned to the present assignee.

The compound which may be co-polymerized with the isoimide may be either an oligomer itself or it may be a monomer. This compound or resultant combination of isoimide oligomer and compound should have the following characteristics: (1) the compound must be mutually soluble with the isoimide below a certain reactive temperature to form a homogeneous mixture, (2) the isoimide oligomer and compound will have functional reactive terminal groups, (3) the isoimide oligomer and compound will not react below said certain reactive temperature, (4) the isoimide oligomer and compound will react when heated above said certain reactive temperature to form an imide copolymer, and (5) the isoimide oligomer, in the presence of such other compound, is capable of being converted to an imide copolymer. The compound preferably (6) should not adversely affect the desired toughness characteristics and other properties of the polyimide produced from the isoimide oligomer or the isoimide oligomer per se, and (7) should not adversely affect the desirable processing characteristics afforded by the isoimide oligomer, and (8) should have a lower melting point than the isoimide oligomer.

The compound and the isoimide oligomer should be mutually soluble as aforesaid which comprises (1) solubility of the oligomer in the compound or (2) solubility of the compound in the oligomer, or (3) solubility of both in a common solvent, if neither is readily soluble in the other. The solvent systems which may be used are hereinafter described in more detail.

The compound which is co-polymerized with the isoimide oligomer according to the invention may be mono-functional or poly-functional, e.g. di-functional, due to the fact that the copolymer thus formed is a three-dimensional copolymer structure. The compound preferably has a lower melting point than such oligomer, and may be a sulfone having functional terminal groups, preferably an acetylene-terminated aryl sulfone. Among the latter compounds, 4,4'-bis(3-ethynylphenoxy)diphenylsulfone of the following structural formula is preferred.

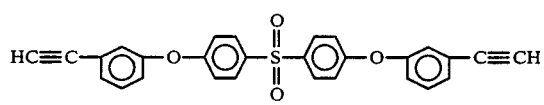

Compounds other than sulfones, and which contain terminal functional groups, can be employed, such as certain selected difunctional groups or a mono-, di- or polyethynyl-substituted aryl compound, e.g. diethynylbenzene. Phenylacetylene and similar aromatic acetylene compounds may be used. Other compounds which may copolymerize with the isoimide oligomer include, for example, monovinylbenzene, methylvinylbenzene, and ethylvinylbenzene. In addition, the vinyl groups do not necessarily have to be attached to the same aryl group, as, for example, in a compound having the following structural formula:

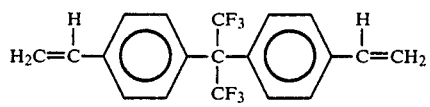

Still other compounds which may copolymerize with the isoimide oligomers are the ethylvinyl ethers, ethynylated substituted ethers, and particularly, the ethynylated polyaromatic ethers containing one or more and preferably two ethynyl groups, as for example, those compounds which have the structural formula:

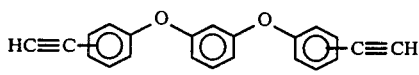

An example of such a polyaromatic ether is 1,3-bis(ethynylphenoxy)benzene. This latter compound when copolymerized with an isoimide oligomer of the present invention is used in a ratio of one part of the compound to three parts of the isoimide oligomer and is heated to a reaction temperature of about 100° C. In all such compounds, the meta orientation is preferred to obtain lower melting point properties.

Other ethynylated polyaromatic compounds which may be used have the structural formula:

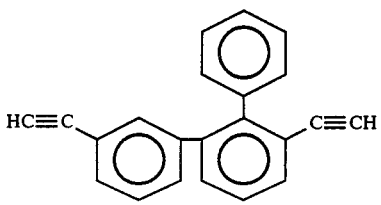

Ethynylated thiophenyl compounds having the following structural formula may be used:

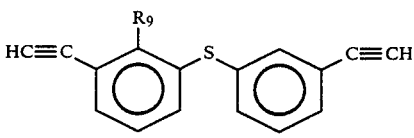

In the above compound, $R_9$ is alkyl and preferably alkyl containing 1 to 30 carbon atoms or phenyl. The $R_9$ group serves as a plasticizer and also operates as a stabilizing group.

Other ethynylated thiophenyl compounds such as 1,3-bis(3-ethynylthiophenyl)benezene, having the following structural formula may be used:

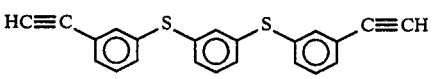

It is also possible to use a hybrid of the S and O ethynylated polyaromatics. These compounds can also be halogenated with fluorine or chlorine.

In addition, aromatic phosphate esters may be used as the compound to copolymerize with the isoimides. Representative examples are tricresylphosphates and triphenylphosphate. Ethynylated mixed alkyl aromatic phosphate esters which may be used include the ethynylated alkyls such as ethynylated alkanes, e.g. 1-hexyne, diethynylbutane, diethynylpentane, diethynylhexane.

Ethynylated aliphatic oils also may copolymerize with the isoimide oligomers as for example, diethynylated octane, diethynylated dodecane, etc.

Such terminal groups present on the sulfone or other equivalent compound noted above, can be the same as the terminal groups on the isoimide oligomers noted above. The functional groups may contain carbon-to-carbon unsaturation, such as ethylenic or acetylenic unsaturation, and can, for example, be vinyl groups or acetylenic groups. Other unsaturated terminal groups, such as maleimide terminated sulfones can be employed.

The ratios of the two compounds, that is, isoimide oligomer and sulfone or equivalent compound which can be employed can range from about 95 to 5% isoimide oligomer, and 5 to 95% of sulfone or equivalent compound, by weight; preferably about 10 to about 90% of isoimide oligomer and 90 to 10% of sulfone or equivalent compound, by weight, is employed; and most desirably about 20 to about 40% of isoimide oligomer and about 80 to about 60% of sulfone or equivalent compound, by weight. However, the amounts of isoimide oligomers and other compounds employed will, to a large extent, depend on the degree of toughness desired and other desired physical or chemical properties.

In practice, a sufficient amount of the sulfone or equivalent compound is employed in conjunction with the isoimide oligomers to obtain a mixture or solution system which has sufficient fluidity at temperatures to enable the mixture to be employed for melt impregnation and encapsulating applications. The resin can also be used for other purposes such as molding, etc. The higher the percentage of the sulfone employed as solvent for copolymerization with the isoimide oligomer, the lower the melting point of the resulting blend or mixture will be.

By forming the above noted copolymer of the isoimide oligomer and other compound, in place of the imide polymer itself, for producing cured imide copolymer resins, a substantial amount of the inexpensive sulfone or equivalent compound can be employed while utilizing the relatively expensive isoimide oligomer in smaller amounts.

It is also possible to form copolymers of different molecular weight portions of the same or similar oligomers. For example, it is possible to copolymerize a specified isoimide oligomer having a degree of polymerization of, e.g., 3 with the same isoimide oligomer having a degree of polymerization of, e.g., 6. Further it is possible to copolymerize an isoimide oligomer having a DP of, e.g., 3 with a different isoimide oligomer of a DP of 3 or a different isoimide oligomer having a DP of, e.g., 7.

Thus, by forming a copolymer of an isoimide oligomer and a sulfone or equivalent compound, according to the invention, all of the advantages of the isoimide oligomer homopolymerization are also obtained, that is, production of cured resins having high strength and temperature characteristics and good electrical properties. In addition the cured resins have low void content and little or no brittleness. The copolymer can also be employed to fabricate films for coatings or free-standing structures.

The preferred sulfones which are employed as solvents for copolymerization with the isoimide oligomers, are acetylene-terminated sulfones, the compound 4,4'-bis(3-ethynylphenoxy)diphenylsulfones (ATS) being particularly preferred.

ATS produces particularly advantageous copolymers when employed in conjunction with the specific isoimide oligomer prepared by reacting 3,3',4,4'-benzophenone tetracarboxylic dianhydride (BTDA) with 1,3-di(3-aminophenoxy)benzene, and 3-aminophenylacetylene.

In preparing the mixtures or solutions of the isoimide oligomers and the sulfones or equivalent compounds, solvents are usually difficult to use because it is often difficult to remove the solvents and particularly the last traces of such solvent or solvents. This can lead to voids in the resin when the latter is cured.

A solvent system is not always desirable but may be required on certain occasions in preparing mixtures or solutions of the oligomer and other compounds, as aforesaid. Thus, for example, it may be desirable to dissolve the compound and the isoimide oligomer in a common solvent if the two reactants would not otherwise be soluble. Further, it may be desirable to use a solvent to avoid excessively heating the mixture which would undesirably shorten the gel time. Exemplary solvents which can be used include tetrahydrofuran, dioxane, methylethylketone, N,N-dimethylformamide, N,N-dimethylacetamide, N-methylpyrrolidone, and the like. Preferred solvents are those which can be removed easily at a temperature which is sufficiently low that the resin mixture is not advanced. It is essential that the solvent can be stripped below the polymerization temperature of the two co-reactants, or otherwise, stripping of the solvent could inadvertently cause the copolymerization between the reactants to occur prematurely.

In preparing liquid mixtures of the isoimide oligomer and the sulfone or equivalent compound, the mixture is heated to a relatively low temperature to melt the solid compound and form a liquid blend of the isoimide oligomer and the sulfone. Where a solvent is employed in preparing the mixtures or solutions of the isoimide oligomer and the sulfone, these compounds are first dissolved in a mutual solvent such as tetrahydrofuran, and the latter solvent is stripped from the mixture. The resulting solids containing the isoimide oligomer and the sulfone or equivalent compound, are then heated to a relatively low temperature to melt the solid and form a liquid blend of the isoimide oligomer and the sulfone.

In either case, the resulting liquid blend of the isoimide oligomer and the sulfone or equivalent compound is used as a castable solventless isoimide resin blend which, upon heating at suitable temperatures, produces a tough copolymer resin matrix having highly desirable properties. Hence, since isoimide oligomers, particularly acetylene-terminated oligomers, having a relatively high degree of polymerization, can be dissolved in the sulfones such as ATS above, it is possible to tailor the fracture toughness of the cured resin. Thermal isomerization of the isoimides to the imide during curing takes place at about the same temperature range that copolymerization of the acetylene terminal groups on the isoimides and the sulfone occurs. Under these conditions the resulting copolymer resin has excellent high temperature properties.

Examples of representative isoimide oligomers which can be employed for copolymerization with the sulfones or equivalent compounds according to the invention are described in Examples I through IX below. Examples X through XIV are representative of practice of the present invention for producing a copolymer of an isoimide and another compound.

EXAMPLE I

Benzophenone tetracarboxylic dianhydride (15.0 grams, 0.0466 mole) in 250 ml of tetrahydrofuran at 60°-65° C. was reacted with 3-aminophenylacetylene (10.9 grams, 0.0932 mole) for 1 hour. The solution was cooled and treated with trifluoroacetic anhydride (60 grams) maintaining the temperature at 10°-18° C. The reaction mixture was kept at 20°-25° C. for 18 hours and the bis-isoimide was recovered by precipitation in hexane and then dried in a vacuum. The bis-isoimide was mostly isoimide (about 90%); the remainder was imide as determined by infrared spectroscopy. A yield of 17 grams was isolated. The resultant product had a melting point at 180°-190° C.

EXAMPLE II

A three-necked one liter round bottom flask was fitted with a heating mantle, Tru-bore stirrer, reflux condenser, thermometer and addition funnel. The top of the reflux condenser was protected from atmospheric moisture with a drying tube.

The flask was charged with benzophenone tetracarboxylic dianhydride (30 grams, 0.0932 mole) and dry tetrahydrofuran. The solution was heated to a gentle reflux and a solution of 1,3-di(3-aminophenoxy)benzene (13.9 grams, 0.0476 mole) in dry tetrahydrofuran (125 ml) was added dropwise over a 30-40 minute period. Then the reaction mixture was stirred for an additional 30 minutes and a solution of 3-aminophenylacetylene (10.9 grams, 0.0932 mole) in dry tetrahydrofuran (30 ml) was added.

After the addition of the 3-aminophenylacetylene, the solution was heated at a gentle reflux for an additional 30 minutes, cooled to ambient temperature, and trifluoroacetic anhydride (110 grams) was added dropwise, maintaining the temperature at ambient by means of an ice bath. The reaction mixture was maintained at room temperature for approximately 18 hours. The oligomer was then precipitated by pouring the reaction mixture into 2300 ml of hexane and the oligomer washed with fresh hexane.

The product was dried in a rotary film evaporator at 85° C. for several hours. The bright yellow oligomer weighed 52 grams. The product showed a characteristic infrared isoimide absorption at 1805 cm$^{-1}$ with only a very small amount of imide at 1780 cm$^{-1}$. The oligomer melted at 150°-155° C.

EXAMPLE III

A three-necked one liter round bottom flask was fitted with a heating mantle, Tru-bore stirrer, reflux condenser, thermometer, and addition funnel. The top of the reflux condenser was protected from atmospheric moisture with a drying tube.

The flask was charged with benzophenonetetracarboxylic dianhydride (30 grams, 0.0932 mole) and dry tetrahydrofuran (300 ml). The solution was heated to a gentle reflux and a solution of 1,3-di(3-aminophenoxy)benzene (13.9 grams, 0.0476 mole) in dry tetrahydrofuran (125 ml) was added dropwise over a 30-40 minute period. Then, the reaction mixture was stirred for an additional 30 minutes and a solution of 3-aminophenylacetylene (10.9 grams, 0.0932 mole) in dry tetrahydrofuran (30 ml) was added.

After the addition, the solution was heated at a gentle reflux for an additional 30 minutes, cooled to ambient temperature and trifluoroacetic anhydride (110 grams) was added dropwise, maintaining the temperature at ambient temperature by means of an ice bath. The reaction mixture was maintained at room temperature for approximately 18 hours. The oligomer was then precipitated by pouring the reaction mixture into 2300 ml of hexane and the oligomer washed with fresh hexane.

The product was dried in a rotary film evaporator at 85° C. for several hours. The bright yellow oligomer thus produced weighed 52 grams. The oligomer product showed a characteristic infrared isoimide absorption at 1805 cm$^{-1}$ with only a very small amount of imide at 1780 cm$^{-1}$. The oligomer melts at 150°-155° C.

EXAMPLE IV

To a solution of 1,3-di(3-aminophenoxy)benzene (40.0 grams, 0.1342 mole) in tetrahydrofuran (300 ml) at 60°-65° C., a warm solution of benzophenonetetracarboxylic dianhydride (21.6 grams, 0.06711 mole) in tetrahydrofuran (525 ml) was added dropwise over a 45 minute period. After the addition of the dianhydride solution, the resultant combined solution was heated for an additional 45 minutes and a solution of maleic anhydride (13.2 grams, 0.1342 mole) in tetrahydrofuran (100 ml) was added. The resultant solution was then heated for an additional 45 minutes, cooled to 10° C. and trifluoroacetic anhydride (200 grams) was added dropwise. After stirring at 20°-25° C. for 18 hours the product (57 grams) was isolated by precipitation in hexane and vacuum dried.

EXAMPLE V

To a solution of benzophenone tetracarboxylic dianhydride (48.3 grams, 0.150 mole) in tetrahydrofuran (500 ml) at 60°-65° C., a solution of 4,4'-oxydianiline (15.0 grams, 0.075 mole) in tetrahydrofuran (200 ml) was added dropwise over a 35 minute period. After the addition of the 4,4'-oxydianiline, the reaction mixture was heated at reflux for another 30 minutes and a solution of 3-aminophenylacetylene (17.6 grams, 0.1630 mole) in tetrahydrofuran (100 ml) was added. The mixture was heated at reflux for an additional 30 minutes and cooled to about 5° to 10° C. Thereafter, trifluoroacetic anhydride (200 grams) was added and the mixture was stirred for about 16-18 hours. The yellow product (60 grams) was isolated by precipitation in hexane.

Infrared spectroscopy showed that the product had the characteristic isoimide peak at 1805 cm$^{-1}$ and only a very small amount of imide at 1780 cm$^{-1}$. The product was soluble in acetone, tetrahydrofuran and a number of other solvents. The product also melted at 160°-165° C. and cured readily above its melting point. A Tg (which is the glass transition temperature) greater than 400° C. was obtained for this product.

EXAMPLE VI

This example illustrates the preparation of a cyano-terminated isoimide.

Using the procedure described in Example II, one mole of 3,3',4,4'-diphenyltetracarboxylic dianhydride is reacted with ½ mole of bis(4-aminophenyl)dimethyl silane, and then the product of the reaction is reacted with one mole of 3-aminobenzonitrile. The product is then dehydrated, and analyzed for infrared isoimide absorption.

EXAMPLE VII

This example illustrates the preparation of an oligomer having a degree of polymerization of 2.

To a solution of benzophenonetetracarboxylic dianhydride (71.4 grams, 0.2217 mole) in dioxane (700 ml) at 70° C., a solution of 1,3-di(3-aminophenoxy)benzene (48.5 grams, 0.1661 mole) in dioxane (400 ml) was added dropwise over a 1 hour period. The solution was stirred for 30 minutes and 3-aminophenylacetylene (13.0 grams, 0.111 mole) was added all at once. After stirring at 65°–70° C. for 2 hours, the mixture was cooled to 0° C., and trifluoroacetic anhydride (275 grams) was added over a 15 minute period. The yellow oligomer (135 grams) was isolated by precipitation in hexane.

EXAMPLE VIII

This example illustrates preparation of an isoimide-containing oligomer employing, N,N'-dicyclohexylcarbodiimide as a dehydrating agent.

A 5-liter, three-necked round-bottom flask is fitted with a thermometer and a moisture protected reflux condenser. The flask is charged with the best grade available of benzophenonetetracarboxylic dianhydride (272 grams, 0.8447 mole) and dry tetrahydrofuran (1200 ml). The slurry is warmed to approximately 40°–45° C. and a solution of 1,3-bis(3-aminophenoxy)benzene (123.3 grams, 0.4224 mole) in dry tetrahydrofuran (400 ml) is added dropwise over a 25 minute period with good stirring. The temperature is maintained in the 40°–45° C. range. Most of the benzophenonetetracarboxylic dianhydride is in solution by the end of the addition. Then, 3-aminophenylacetylene (98.8 grams, 0.8447 mole) in dry tetrahydrofuran (200 ml) is added in 15 minutes, maintaining the temperature at 40°–45° C. At the end of the addition all of the reactants are in solution. The reaction mixture is stirred for approximately 30 minutes at ambient temperature and is then cooled to 0°–5° C. A solution of N,N'-dicyclohexylcarbodiimide (354.9 grams, 1.1706 moles, 99%+grade) in dry tetrahydrofuran (400 ml) is added dropwise maintaining the temperature at 0°–5° C. During this addition, N,N'-dicyclohexylurea is precipitated as a by-product. The solution is stirred at ambient temperature for approximately 16 hours, cooled to 0° C. to maximize the amount of N,N'-dicyclohexylurea which can be removed from the reaction mixture. The reaction mixture is filtered and the filtrate is divided into two equal parts. The first part is used to precipitate the oligomer with hexanes, and the second part is used to precipitate the oligomer by dry isopropyl alcohol. Thus, 1 part by volume of the filtered reaction mixture is added to rapidly stirred solvent (4 parts by volume) of either hexanes or isopropyl alcohol. The oligomer is filtered, dried in vacuum at room temperature and the temperature slowly raised to 70° C. over a 24 hour period.

A more quantitive precipitation is effected by the hexane but the oligomer is more difficult to dry. The isopropyl alcohol precipitation results in approximately 86 percent recovery. However, the oligomer is dried to about 1.5 percent volatiles, compared to approximately 4 percent for the hexane precipitation by the above drying process.

EXAMPLE IX

To a solution of 1,3-bis(3-aminophenoxy)benzene (40.0 grams, 0.1342 mole) in tetrahydrofuran (300 ml) at 60°–65° C., a warm solution of benzophenonetetracarboxylic dianhydride (21.6 grams, 0.06711 mole) in tetrahydrofuran (525 ml) was added dropwise over a 45 minute period. After the addition of the dianhydride solution, the resultant combined solution was heated for an additional 45 minutes. Then, 4-ethynylphthalic anhydride (11.54 grams, 0.06711) was added. The solution was heated for an additional hour at reflux, cooled to 0°–5° C. and a solution of N,N'-dicyclohexylcarbodiimide (28.7 grams, 0.1382 mole) in tetrahydrofuran (100 ml) was added while the temperature was maintained below 10° C. After stirring the mixture at ambient temperature overnight the N,N'-dicyclohexlurea thus produced was filtered off and the resultant oligomer was isolated by precipitating the oligomer in hexane. The dried resultant oligomer material was a yellow-powder melting at 175° C.

EXAMPLE X

The 4,4'-bis(3-ethynylphenoxy)diphenylsulfone (ATS) monomer was isolated in about 50 percent yield from ATS oligomer obtained from Gulf Chemicals Company. The ATS monomer was separated from the oligomer by column chromatography using silica gel as a substrate and a 1:2 mixture of hexanes and methylene chloride as an eluant.

A mixture of 20% by weight of the isoimide oligomer prepared above in Example III and 80% by weight of the above ATS monomer was made by dissolving 2.5 grams of the isoimide oligomer and 10 grams of ATS monomer in 100 ml of tetrahydrofuran. The solvent was stripped on a rotary film evaporator and the residue freed of traces of solvent using a Kugelrohr apparatus (which is a short path distillation apparatus) at a pressure of less than one micron and a temperature of 110° C. The amber solid residue melted at about 70° C. and was quite fluid at 70° C. It was possible to cast a solid rod, 2.5 cm in diameter, 3 cm long, in a test tube at 130° C. The resin was degassed and cured by heating at 150° C. for several hours to form the isoimide oligomer-sulfone copolymer. Further heating occurred at 200° C. for several hours, 250° C. for 1 hour and 300° C. for 2 hours. The cured copolymer resin was quite tough. Infrared spectrographic analysis of the cured product showed the absence of the characteristic absorption peaks for the acetylene and the isoimide moieties. In addition, the homogeneity of the product was verified by measuring the dynamic mechanical properties of the product with a Rheovibron Dynamic Viscoelastometer obtained from Toyo Baldwin Co. Ltd. of Japan.

EXAMPLE XI

The procedure of Example X was repeated but employing a solution of 40% by weight of the isoimide oligomer and 60% by weight of the ATS monomer. The melting point of the resulting mixture or solution was higher (about 135° C.) and less fluid than the 20% mixture of isoimide oligomer in ATS monomer of Example X, but could be cast into a rod at about 170° C. A similar cure cycle as in Example X yielded a tough copolymer resin matrix. IR and Rheovibron testing produced results similar to those described in Example X.

EXAMPLE XII

Using the procedure of Example X additional typical mixtures were made by blending the isoimide oligomer resin of Example III having a degree of polymerization of 10, designated HR610P, and the same isoimide oligomer but having a degree of polymerization of 5, designated HR605P, with the ATS sulfone, using tetrahydrofuran as a common solvent and distilling off the solvent as in Example X. The beginning of softening is shown in Table II.

TABLE II

| COMPOSITION BY WEIGHT | | START OF MELTING, °C. |
|---|---|---|
| ATS (80%), | HR605P (20%) | 55 |
| ATS (60%), | HR605P (40%) | 90 |
| ATS (80%), | HR610P (20%) | 58 |
| ATS (60%), | HR610P (40%) | 95 |
| ATS (40%), | HR610P (60%) | 130 |
| ATS (20%), | HR610P (80%) | 155 |
| — | HR605P (100%) | 135 |
| — | HR610P (100%) | 210 |

Table II shows the remarkable increase in fluidity and drop in melt temperatures using blends of the ATS sulfone and isoimide oligomer, as contrasted to the melt temperature for the corresponding isoimide oligomers alone, namely HR605P and HR610P. Both the solutions or blends of ATS (80%) with HR605P (20%), and ATS (80%) with HR610P (20%) had sufficient fluidity at 135° C. that they could be poured into a test tube or beaker, degassed and cured at 135°-150° C. and further post-cured up to 300° C. By curing at 150° C. under 100 psi in an autoclave, specimens free of gas bubbles could be obtained. The post-cure up to 300° C. can then be done at atmospheric pressure.

The blends or solutions of Table II can be used as encapsulants. Films from the above blends were also cast on glass plates, employing a 10% solvent mixture of the blend in a solvent of 95% tetrahydrofuran and 5% N-methylpyrrolidone. After initial air drying, the film was cured at 259° C. IR and Rheovibron testing produced results similar to those described in Example X.

EXAMPLE XIII

A mixture of 20% by weight of the isoimide oligomer prepared in Example III and 80% by weight of diethynylbenzene was made.

Upon heating the mixture to about 60° C., the oligometer dissolved in the diethynylbenzene, and the resulting solution was poured upon a substrate and cured at temperature ranging from about 120° C. to about 180° C. to produce a tough copolymer resin matrix. IR and Rheovibron testing produced results similar to those described in Example X.

EXAMPLE XIV

The procedure of Example XIII was repeated except employing a solution of 40% by weight of the isoimide oligomer and 60% by weight of diethynylbenzene. The resulting solution had a higher melting point (30° C. higher) and was less fluid than the mixture of Example XIII, but was capable of being poured onto a substrate and cured at 180° C. to form a tough copolymer matrix.

EXAMPLE XV

A mixture of 50% by weight of the isoimide oligomer in Example III and 50% by weight of phenylacetylene was heated to about 80° C. The oligomer dissolved in the phenylacetylene and the resulting solution was poured upon a substrate and cured at temperatures ranging from about 120° C. to about 180° C. to produce a copolymer resin matrix. IR and Rheovibron testing produced results similar to those described in Example X.

From the foregoing, it is seen that the present invention provides solutions or blends of isoimide oligomers containing functional groups, dissolved in a compound containing functional groups, such as sulfones, preferably acetylene-terminated isoimide oligomers and acetylene-terminated sulfones, particularly 4,4'-bis(3-ethynylphenoxy)diphenylsulfone (ATS), which are unreactive with each other below a certain temperature and have a low melting point as compared to the isoimide oligomers alone, but which readily react to form copolymers at elevated temperatures. Thus, such solutions or blends can be employed as encapsulants, coatings, films and resin matrices for composites, to provide copolymerized polyimide resins having excellent mechanical properties at high temperature and good electrical characteristics.

Thus, there has been described novel imide copolymers and a method of preparing same from an isoimide oligomer and another compound having reactive functional groups which react upon heating. This copolymer and the method of preparing same thereby fulfills all of the objects and advantages sought therefor. It should be understood that many changes, modifications, variations and other uses and applications will become apparent to those skilled in the art after considering this specification. Therefore, any and all such changes, modifications, variations and other uses and applications which become apparent to those skilled in the art after considering this specification are deemed to be covered by the invention.

What is claimed is:

1. A copolymer prepared by copolymerizing an isoimide oligomer having a structure selected from the group consisting of:

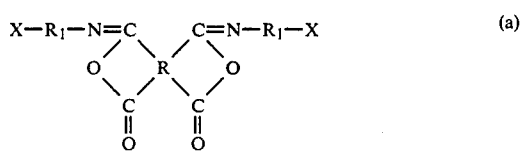

(a)

where R is a tetravalent aryl group containing 2 to 27 carbon atoms, $R_1$ is a divalent organic group containing 1 to 20 carbon atoms, and X is selected from the group consisting of —C≡CH, —CH=CH$_2$, and —CN;

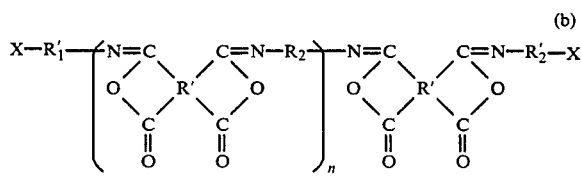

(b)

where R' is a tetravalent aryl group containing 6 to 18 carbon atoms, $R_1'$ is a $C_6$ to a $C_{20}$ arylene group, $R_2$ is a divalent organic group containing 2 to 30 carbon atoms, X is as defined above, and n denotes the degree of polymerization and is 0 or 1 to about 30; and

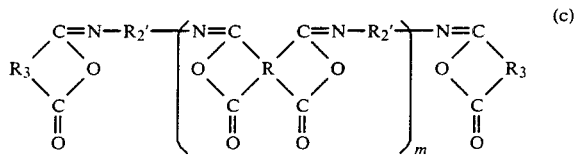
(c)

where R is a tetravalent aryl group containing 2 to 27 carbon atoms, $R_2'$ is a divalent aryl group containing 6 to 30 carbon atoms, $R_3$ is a radical containing an alkenylene group, or a trivalent aryl group or heterocyclic group having substituted thereon X as defined above, and m denotes the degree of polymerization and is 1 to about 30 with another compound selected from the group consisting of an ethynyl-terminated sulfone, an acetylene-terminated sulfone, an ethynyl-terminated aryl compound, and an acetylene-terminated aryl compound, said isoimide oligomer being initially soluble in and unreactive with said compound below a predetermined temperature at which said isoimide oligomer and said compound chemically react so that said isoimide oligomer and said compound remain as an unreacted liquid blend below said predetermined temperature, and wherein said isoimide oligomer and said compound react to form said copolymer upon heating said liquid blend to a temperature above said predetermined temperature.

2. The copolymer as defined in claim 1, wherein said compound is selected from the group consisting of mono-, di-, and poly-ethynyl substituted aryl compounds.

3. The copolymer as defined in claim 1, wherein said isoimide oligomer is an acetylene-terminated isoimide oligomer and said other compound is an acetylene-terminated aryl sulfone, said copolymer having high temperature resistant properties.

4. The copolymer as defined in claim 1, wherein said oligomer is the reaction product of 3,3',4,4'-benzophenonetetracarboxylic dianhydride, 1,3-di(3-aminophenoxy)benzene and 3-aminophenylacetylene, and which reaction product is cyclized to form said isoimide oligomer, of structure (b) and said sulfone is 4,4'-bis(3-ethynylphenoxy)diphenylsulfone.

5. The copolymer as defined in claim 1, structure (a) wherein $R_1$ is a $C_1$ to $C_5$ alkylene group or a $C_6$ to $C_{20}$ arylene group.

6. The copolymer as defined in claim 1, structure (b) wherein n is 0 or 1 to about 15.

7. The copolymer as defined in claim 1, structure (c) where m is 1 to about 15.

8. The copolymer as defined in claim 1, wherein said compound is selected from the group consisting of 4,4'bis(3-ethynylphenoxy)diphenylsulfone, phenylacetylene and diethynylbenzene.

9. The copolymer as defined in claim 1, structure (c) wherein said oligomer is the reaction product of 3,3',4,4'-benzophenonetetracarboxylic dianhydride, 1,3-bis(3-aminophenoxy)benzene and 4-ethynylphthalic anhydride, and which reaction product is cyclized to form said isoimide oligomer, and said sulfone is 4,4'-bis(3-ethynylphenoxy)diphenylsulfone.

10. A solution of an isoimide oligomer and another compound as defined in claim 1, wherein said isoimide oligomer and said compound react to form a copolymer upon heating above said predetermined temperature.

11. The solution as defined in claim 10, wherein said solution comprises a resin mixture for a castable resin which consists essentially by weight of:
(a) about 95 to about 5 percent of said isoimide; and
(b) about 5 to about 95 percent of said compound.

12. The solution as defined in claim 11, wherein said compound is selected from the group consisting of a sulfone, and mono-, di-, and poly-ethynyl substituted aryl compounds.

13. The solution as defined in claim 12, wherein said compound is selected from the group consisting of 4,4'-bis(3-ethynylphenoxy)diphenylsulfone, phenylacetylene and diethynylbenzene.

14. The solution as defined in claim 10, wherein said other compound is a sulfone having terminal groups containing ethylenic or acetylenic unsaturation.

15. The solution as defined in claim 10, wherein said other compound is a sulfone and said solution consists essentially of:
(a) about 90 to about 10 percent of said isoimide oligomer; and
(b) about 10 to about 90 percent of said sulfone, by weight.

16. The solution as defined in claim 15, wherein said isoimide oligomer is an acetylene-terminated isoimide oligomer and said other compound is an acetylene-terminated aryl sulfone.

17. The solution as defined in claim 10, including a solvent for said isoimide oligomer and said compound.

18. The solution as defined in claim 14, including a solvent for said isoimide oligomer and said sulfone, said solvent selected from the group consisting of tetrahydrofuran, dioxane, methyl ethyl ketone, N,N-dimethylformamide, N,N-dimethylacetamide, and N-methylpyrrolidone.

19. The solution as defined in claim 18, said solution consisting essentially, by weight, of:
(a) about 20 to about 40 percent of said oligomer; and
(b) about 80 to about 60 percent of said sulfone.

20. The solution as defined in claim 10, wherein said oligomer is the reaction product of 3,3',4,4'-benzophenone tetracarboxylic dianhydride, 1,3-di(3-aminophenoxy)benzene and 3-aminophenylacetylene, and which reaction product is cyclized to form said isoimide oligomer of structure (b), and said compound is 4,4'-bis(3-ethynylphenoxy)diphenylsulfone.

21. The process for producing a copolymer as set forth in claim 1, of an isoimide oligomer and another compound comprising:
(a) dissolving said isoimide oligomer in said compound below said predetermined temperature to produce a solution in liquid form; and
(b) heating said solution above said predetermined temperature to cause said isoimide oligomer and said compound to react to form said copolymer.

22. The process as defined in claim 21, which further includes casting said solution on a substrate prior to said heating of said solution.

23. The process as defined in claim 21, which further includes forming a film of said solution on a substrate prior to said heating of said solution.

24. The process as defined in claim 21, said solution comprising a resin blend for a castable resin which consists essentially, by weight, of:
(a) about 95 to about 5 percent of said isoimide oligomer; and
(b) about 5 to about 95 percent of said compound.

25. The process as defined in claim 24, wherein said compound is selected from the group consisting of a sulfone, and mono-, di-, and poly-ethynyl substituted aryl compounds.

26. The process as defined in claim 24, wherein said compound is selected from the group consisting of 4,4'-bis(3-ethynylphenoxy)diphenylsulfone, phenylacetylene and diethynylbenzene.

27. The process as defined in claim 21, wherein said another compound is a sulfone containing terminal groups having ethylenic unsaturation.

28. The process as defined in claim 21, wherein said other compound is a sulfone, and said solution consists essentially of:
    (a) about 90 to about 10 percent of said isoimide oligomer; and
    (b) about 10 to about 90 percent of said sulfone, by weight.

29. The process as defined in claim 24, wherein said isoimide oligomer is an acetylene-terminated isoimide oligomer and said other compound is an acetylene-terminated aryl sulfone.

30. The process as defined in claim 21, including a solvent for said isoimide oligomer and said compound.

31. The process as defined in claim 24, including a solvent for said isoimide oligomer and said sulfone, said solvent selected from the group consisting of tetrahydrofuran, dioxane, methyl ethyl ketone, N,N-dimethylformamide, N,N-dimethylacetamide, and N-methylpyrrolidone.

32. The process as defined in claim 21, wherein said oligomer is the reaction product of 3,3',4,4'-benzophenone tetracarboxylic dianhydride, 1,3-di(3-aminophenoxy)benzene and 3-aminophenylacetylene, and which reaction product is cyclized to form said isoimide oligomer of structure (b), and said compound is 4,4'-bis(3-ethynylphenoxy)diphenylsulfone.

33. A composition for producing a castable solution which is curable to a polyimide resin, comprising:
    (a) an acetylene-terminated isoimide oligomer as set forth in claim 1; and
    (b) an acetylene-terminated sulfone, said composition melting by heating at a relatively low temperature.

34. The composition as defined in claim 33 employing about 95 to about 5 percent of said oligomer and about 5 to about 95 percent of said sulfone, by weight.

35. The composition as defined in claim 33 employing about 20 to about 40 percent of said oligomer and about 80 to about 60 percent of said sulfone, by weight.

36. The composition as defined in claim 33, said oligomer being a compound having the structure (b) as set forth in claim 1.

37. The composition as defined in claim 36, said composition being a resin mixture employing about 20 to about 40 percent of said oligomer and about 80 to about 60 percent of said sulfone, by weight.

38. The composition as defined in claim 36, said composition being a resin mixture, said oligomer is the reaction product of 3,3',4,4'-benzophenone tetracarboxylic dianhydride, 1,3-di(3-aminophenoxy)benzene and 3-aminophenylacetylene, and which reaction product is cyclized to form said isoimide oligomer.

39. The composition as defined in claim 36, said composition being a resin mixture, said sulfone being 4,4'-bis(3-ethynylphenoxy)diphenylsulfone.

* * * * *